United States Patent
Nakata

(10) Patent No.: US 7,152,433 B2
(45) Date of Patent: *Dec. 26, 2006

(54) METHOD OF MANUFACTURING IMAGE DISPLAY APPARATUS AND APPARATUS FOR MANUFACTURING THE SAME

(75) Inventor: Kohei Nakata, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 390 days.

This patent is subject to a terminal disclaimer.

(21) Appl. No.: 10/212,098

(22) Filed: Aug. 6, 2002

(65) Prior Publication Data

US 2003/0029196 A1  Feb. 13, 2003

(30) Foreign Application Priority Data

Aug. 9, 2001  (JP) .......................... 2001-241974

(51) Int. Cl.
*C03C 27/10* (2006.01)
(52) U.S. Cl. .............................. 65/32.2; 65/43; 65/58; 445/25; 445/41; 445/43; 445/44
(58) Field of Classification Search ............... 65/32.1, 65/32.2, 40, 43, 58, 152, 154, 155, 157, 162; 445/25, 41–44, 54
See application file for complete search history.

(56) References Cited

U.S. PATENT DOCUMENTS

| | | | | |
|---|---|---|---|---|
| 2,624,979 A | * | 1/1953 | Phalin et al. | 65/23 |
| 2,900,761 A | * | 8/1959 | Clever | 65/23 |
| 2,977,722 A | * | 4/1961 | Mazzoni | 65/23 |
| 3,268,316 A | * | 8/1966 | Snyder | 65/54 |
| 3,519,409 A | * | 7/1970 | Stutzman | 65/40 |
| 3,522,026 A | * | 7/1970 | Petrella et al. | 65/40 |
| 5,009,689 A | * | 4/1991 | Haisma et al. | 65/33.2 |
| 5,693,111 A | * | 12/1997 | Kadowaki et al. | 65/43 |
| 6,140,767 A | | 10/2000 | Sreeram et al. | 313/582 |
| 6,254,449 B1 | | 7/2001 | Nakanishi et al. | 445/25 |
| 6,321,569 B1 | | 11/2001 | Sreeram et al. | 65/42 |
| 6,702,636 B1 | * | 3/2004 | Nakata et al. | 445/25 |
| 2002/0038558 A1 | * | 4/2002 | Nakata et al. | 65/29.19 |

FOREIGN PATENT DOCUMENTS

| | | |
|---|---|---|
| CN | 1252888 | 5/2000 |
| JP | 11-135018 | 5/1999 |

* cited by examiner

*Primary Examiner*—Sean Vincent
(74) *Attorney, Agent, or Firm*—Fitzpatrick, Cella, Harper & Scinto

(57) ABSTRACT

A method of manufacturing an image display apparatus is provided and includes the steps of bringing panel members that constitute a display panel of the image display apparatus into a bake processing chamber, subjecting to bake processing the display panel members, lowering a temperature of the display panel members, and bringing the display panel members into a seal-bonding processing chamber. Seal-bonding processing is conducted by local heating to a seal-bonding portion.

19 Claims, 2 Drawing Sheets

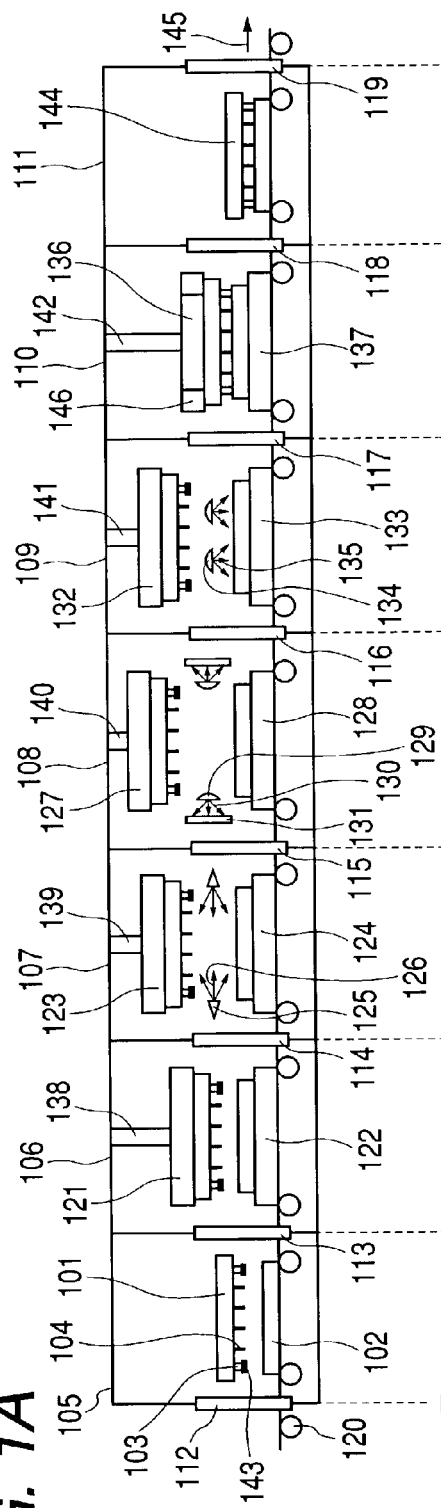
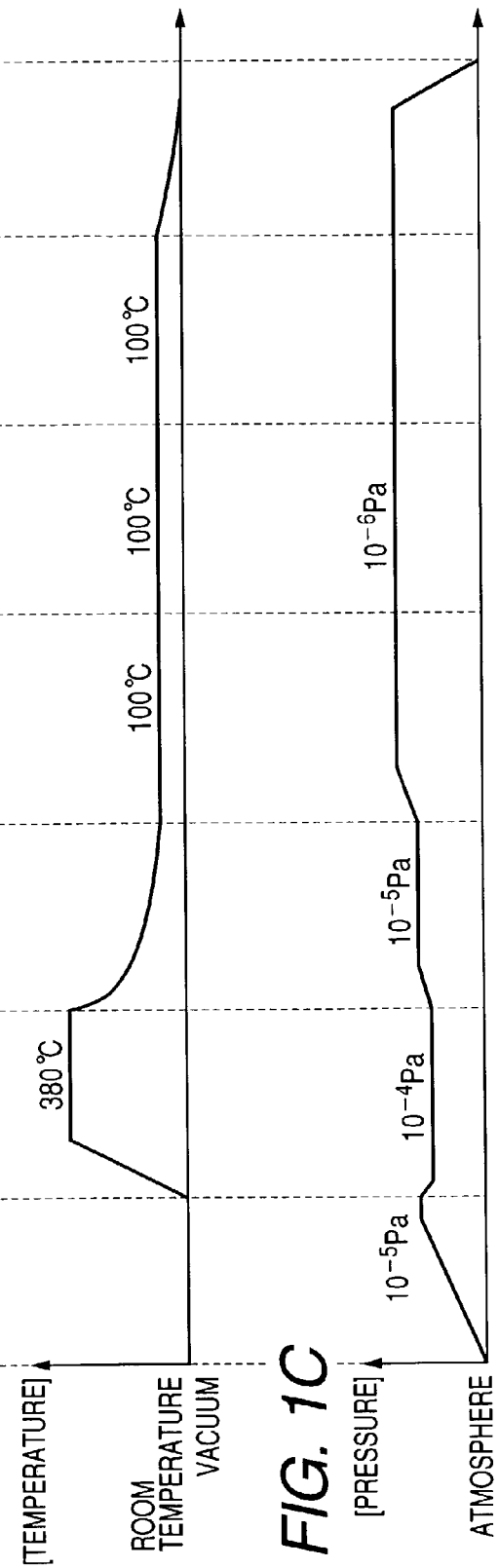

METHOD OF MANUFACTURING IMAGE DISPLAY APPARATUS AND APPARATUS FOR MANUFACTURING THE SAME

BACKGROUND OF THE INVENTION

1. Field of the Invention

The present invention relates to a method of manufacturing an image display apparatus which includes the steps of: performing bake processing to panel members constituting a display panel of the image display apparatus; and combining and seal-bonding the members, thereby forming the display panel and to an apparatus for manufacturing the image display apparatus.

2. Related Background Art

Up to now, as a method of manufacturing an image display apparatus which includes the steps of combining and seal-bonding panel members that have undergone bake processing, thereby forming a display panel, such a method is known in which: panel members are placed in a vacuum chamber and subjected to bake processing; moisture and gas components, which are adhered or adsorbed to the panel members, are removed; also, the vacuum chamber is exhausted to obtain a predetermined depressurized condition; and then, the panel members are sealed using frit glass melted by heat at the time of bake processing, and cooled to a room temperature to be carried out from However, in the conventional manufacturing the chamber (JP 11-135018). method, bake processing and seal processing are conducted in the same vacuum chamber, and thus, the following steps: a step of raising a temperature to a predetermined temperature; a step of exhausting moisture and gas emitted through bake processing, thereby obtaining a predetermined vacuum atmosphere; a step of conducting seal bonding; and a step of lowering a temperature to a temperature at which panel members can be taken out, are performed in one vacuum chamber. This provides a problem in that a processing time is long and efficiency is poor.

SUMMARY OF THE INVENTION

The present invention has been made in view of the above, and has an object to make it possible to efficiently perform various kinds of processing without disturbing the use of a seal-bonding material with a high seal-bonding temperature in the manufacture of an image display apparatus which includes the steps of: subjecting to bake processing panel members constituting a display panel of the image display apparatus; and combining and seal-bonding the members, thereby forming the display panel.

According to the present invention, there is provided a method of manufacturing an image display apparatus, including the steps of: conveying panel members constituting a display panel of the image display apparatus to a plurality of depressurized processing chambers in due order and performing a plurality of kinds of processing, thereby forming the display panel, in which:

the plurality of processing chambers include a bake processing chamber for conducting bake processing to the panel members and a seal-bonding processing chamber for assembling and seal-bonding the panel members; and a temperature of the panel members that have undergone bake processing in the bake processing chamber is lowered, then, the panel members are brought into the seal-bonding processing chamber, and seal-bonding processing in the seal-bonding processing chamber is conducted by locally heating a seal-bonding portion of the panel members.

Further, according the present invention, there is provided a method of manufacturing an image display apparatus, including the steps of: conveying panel members constituting a display panel of the image display apparatus to a plurality of depressurized processing chambers in due order and performing a plurality of kinds of processing, thereby forming the display panel, in which:

the plurality of processing chambers include a bake processing chamber for subjecting to bake processing to the panel members, a seal-bonding processing chamber for assembling and seal-bonding the panel members, and one or more than one intermediate processing chambers which are intervened between the bake processing chamber and the seal-bonding processing chamber and with which the temperature at the time of carrying-out of the panel members is set to the temperature at the time of bringing-in of the panel members or lower; and the temperature of the panel members that have undergone bake processing in the bake processing chamber is lowered in the intermediate processing chambers, then, the panel members are brought into the seal-bonding processing chamber, and seal-bonding processing in the seal-bonding processing chamber is conducted by locally heating a seal-bonding portion of the panel members.

Further, according to the present invention, there is provided an apparatus for manufacturing an image display apparatus, for performing the steps of: conveying panel members constituting a display panel of the image display apparatus to a plurality of depressurized processing chambers in due order and performing a plurality of kinds of processing, thereby forming the display panel, in which:

the plurality of processing chambers include a bake processing chamber for conducting bake processing to the panel members, a seal-bonding processing chamber for assembling and seal-bonding the panel members, and one or more than one intermediate processing chambers which are intervened between the bake processing chamber and the seal-bonding processing chamber; the bake processing chamber and the intermediate processing chambers are respectively provided with temperature control means for the panel members; the set temperature of the respective temperature control means is set to the set temperature of the temperature control means in the previous processing chamber or lower; and the seal-bonding processing chamber is provided with local heating means for locally heating a seal-bonding portion of the panel members.

BRIEF DESCRIPTION OF THE DRAWINGS

FIGS. 1A, 1B and 1C are diagrams schematically showing an example of a manufacturing apparatus according to the present invention, a temperature profile of panel members in the apparatus, and a pressure profile in each processing chamber, respectively.

DESCRIPTION OF THE PREFERRED EMBODIMENTS

Figure 2:
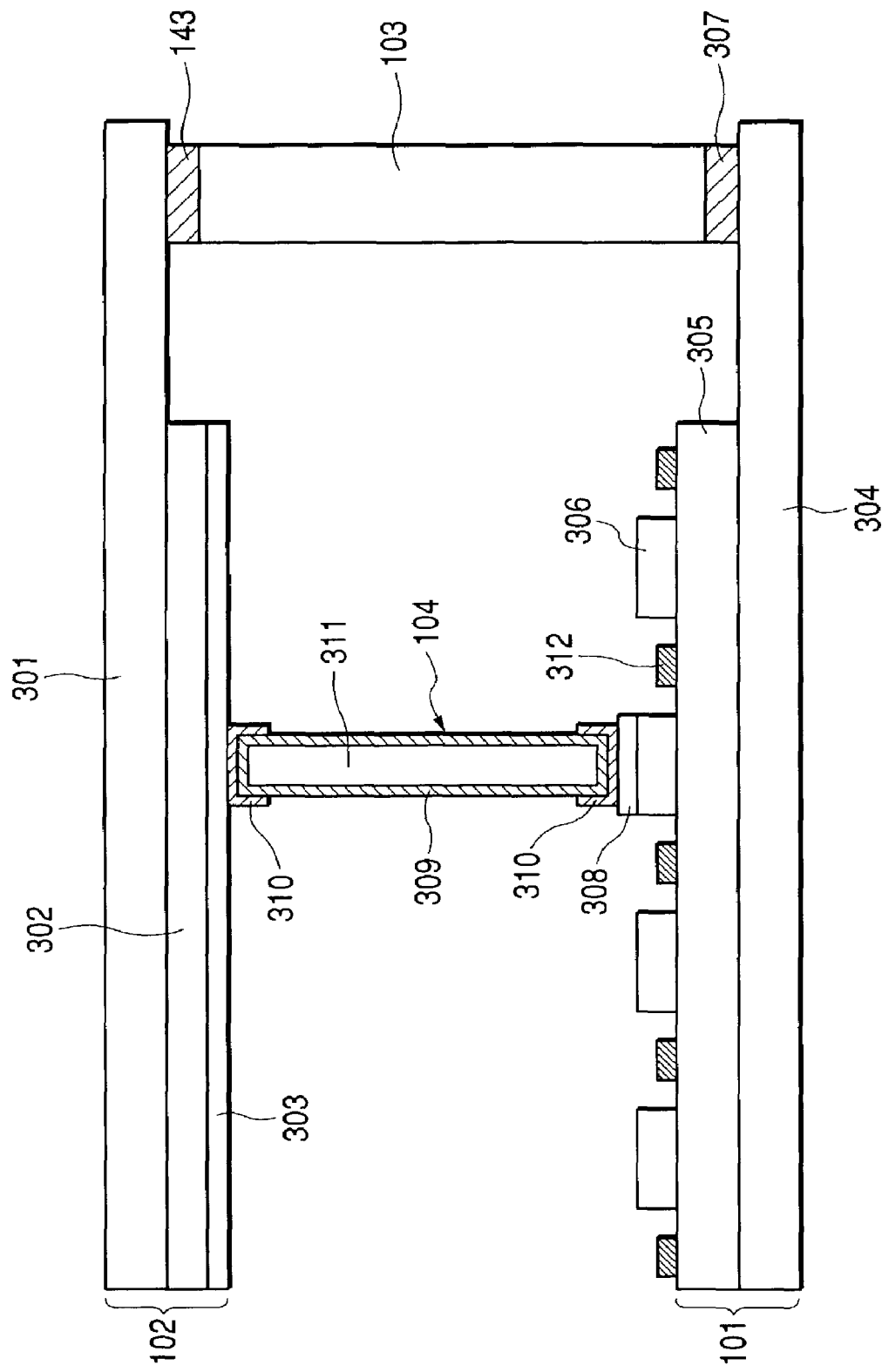
FIG. 2 is a sectional view showing a part of a display panel formed by a manufacturing method and a manufacturing apparatus according to the present invention.

According to a first aspect of the present invention, there is provided a method of manufacturing an image display apparatus, including the steps of: conveying panel members constituting a display panel of the image display apparatus to a plurality of depressurized processing chambers in due order and performing a plurality of kinds of processing, thereby forming the display panel, in which:

the plurality of processing chambers include a bake processing chamber for conducting bake processing to the panel members and a seal-bonding processing chamber for assembling and seal-bonding the panel members; and a temperature of the panel members that have undergone bake processing in the bake processing chamber is lowered, then, the panel members are brought into the seal-bonding processing chamber, and seal-bonding processing in the seal-bonding processing chamber is conducted by locally heating a seal-bonding portion of the panel members.

Further, according to a second aspect of the present invention, there is provided a method of manufacturing an image display apparatus, including the steps of: conveying panel members constituting a display panel of the image display apparatus to a plurality of depressurized processing chambers in due order and performing a plurality of kinds of processing, thereby forming the display panel, in which:

the plurality of processing chambers include a bake processing chamber for conducting bake processing to the panel members, a seal-bonding processing chamber for assembling and seal-bonding the panel members, and one or more than one intermediate processing chambers which are intervened between the bake processing chamber and the seal-bonding processing chamber and with which the temperature at the time of carrying-out of the panel members is set to the temperature at the time of bringing-in of the panel members or lower; and the temperature of the panel members that have undergone bake processing in the bake processing chamber is lowered in the intermediate processing chambers, then, the panel members are brought into the seal-bonding processing chamber, and seal-bonding processing in the seal-bonding processing chamber is conducted by locally heating a seal-bonding portion of the panel members.

In the second aspect of the present invention, the following aspects are included as preferred aspects in which:

a getter processing chamber as the intermediate processing chamber is intervened between the bake processing chamber and the seal-bonding processing chamber; and getter processing is conducted to the panel members, which have passed through the bake processing chamber, in the getter processing chamber;

getter processing to the inside of the getter processing chamber is further conducted in the getter processing chamber;

a cooling processing chamber as the intermediate processing chamber is intervened between the bake processing chamber and the getter processing chamber; and cooling processing is conducted to the panel members, which have passed through the bake processing chamber, in the cooling processing chamber;

a surface purifying processing chamber and a getter processing chamber as the intermediate processing chambers are intervened between the bake processing chamber and the seal-bonding processing chamber; surface purifying processing is conducted to the panel members, which have passed through the bake processing chamber, in the surface purifying processing chamber; and getter processing is conducted to the panel members, which have passed through the surface purifying processing chamber, in the getter processing chamber;

getter processing to the inside of the getter processing chamber is further conducted in the getter processing chamber;

a cooling processing chamber as the intermediate processing chamber is intervened between the bake processing chamber and the surface purifying processing chamber; and cooling processing is conducted to the panel members, which have passed through the bake processing chamber, in the cooling processing chamber;

a cooling processing chamber as the intermediate processing chamber is intervened between the surface purifying processing chamber and the getter processing chamber; and cooling processing is conducted to the panel members, which have passed through the surface purifying processing chamber, in the cooling processing chamber;

the getter processing in the getter processing chamber is conducted immediately after the surface purifying processing in the surface purifying processing chamber;

a surface purifying processing chamber, a preliminary getter processing chamber, and a getter processing chamber as the intermediate processing chambers are intervened between the bake processing chamber and the seal-bonding processing chamber; surface purifying processing is conducted to the panel members, which have passed through the bake processing chamber, in the surface purifying processing chamber; the panel members, which have passed through the surface purifying processing chamber, are brought into the preliminary getter processing chamber to conduct getter processing in the preliminary getter processing chamber; and getter processing is conducted to the panel members, which have passed through the preliminary getter processing chamber, in the getter processing chamber;

a cooling processing chamber as the intermediate processing chamber is intervened between the surface purifying processing chamber and the preliminary getter processing chamber; and cooling processing is conducted to the panel members, which have passed through the surface purifying processing chamber, in the cooling processing chamber;

the getter processing in the getter processing chamber is conducted immediately after the surface purifying processing in the surface purifying processing chamber;

the surface purifying processing is any of processing for purifying surfaces of the panel members with irradiation of electron beams to the surfaces of the panel members, processing for purifying surfaces of the panel members with irradiation of ions to the surfaces of the panel members, processing for purifying surfaces of the panel members with irradiation of ultraviolet rays to the surfaces of the panel members, and processing for purifying surfaces of the panel members with irradiation of plasma to the surfaces of the panel members;

a preliminary getter processing chamber and a getter processing chamber as the intermediate processing chambers are intervened between the bake processing chamber and the seal-bonding processing chamber; the panel members, which have passed through the bake processing chamber, are brought into the preliminary getter processing chamber to conduct getter processing in the preliminary getter processing chamber; and getter processing is conducted to the panel members, which have passed through the preliminary getter processing chamber, in the getter processing chamber;

a cooling processing chamber as the intermediate processing chamber is intervened between the bake processing chamber and the preliminary getter processing chamber; and cooling processing is conducted to the panel members, which have passed through the bake processing chamber, in the cooling processing chamber;

the seal-bonding processing in the seal-bonding processing chamber is processing using a seal-bonding material;

and the seal-bonding material has a seal-bonding temperature that is equal to or higher than the temperature at the time of bringing-in of the panel members to the seal-bonding processing chamber and also is equal to or lower than a local heating temperature of a seal-bonding portion in the seal-bonding processing chamber;

the panel members include a face plate constituting a display surface of the display panel and a rear plate constituting a rear surface of the display panel; and the seal-bonding processing in the seal-bonding processing chamber is processing for seal-bonding the periphery of the face plate and the rear plate opposed to each other;

the seal-bonding processing is processing using a seal-bonding material, and is conducted using the seal-bonding material provided to either or both of the face plate side and the rear plate side; and an outer frame constituting a side surface of the panel is previously fixed to one of the face plate and the rear plate; a seal-bonding material is provided to either or both of the outer frame and the position of the face plate or rear plate which is opposite to the outer frame; and the seal-bonding processing is conducted using the seal-bonding material.

Further, according to a third aspect of the present invention, there is provided an apparatus for manufacturing an image display apparatus, for performing the steps of: conveying panel members constituting a display panel of the image display apparatus to a plurality of depressurized processing chambers in due order and performing a plurality of kinds of processing, thereby forming the display panel, in which:

the plurality of processing chambers include a bake processing chamber for conducting bake processing to the panel members, a seal-bonding processing chamber for assembling and seal-bonding the panel members, and one or more than one intermediate processing chambers which are intervened between the bake processing chamber and the seal-bonding processing chamber; the bake processing chamber and the intermediate processing chambers are respectively provided with temperature control means for the panel members; the set temperature of the respective temperature control means is set to the set temperature of the temperature control means in the previous processing chamber or lower; and the seal-bonding processing chamber is provided with local heating means for locally heating a seal-bonding portion of the panel members.

In the third aspect of the present invention, the following aspects are included as preferred aspects in which:

as the intermediate processing chamber, a getter processing chamber for conducting getter processing to the panel members, which have passed through the bake processing chamber, is intervened between the bake processing chamber and the seal-bonding processing chamber;

as the intermediate processing chambers, a surface purifying processing chamber for conducting surface purifying processing to the panel members, which have passed through the bake processing chamber, and a getter processing chamber for conducting getter processing to the panel members, which have passed through the surface purifying processing chamber, are intervened between the bake processing chamber and the seal-bonding processing chamber;

as the intermediate processing chambers, a surface purifying processing chamber for conducting surface purifying processing to the panel members, which have passed through the bake processing chamber, and a preliminary getter processing chamber to which the panel members that have passed through the surface purifying processing chamber are conveyed and in which getter processing to the inside of the processing chamber is conducted, and a getter processing chamber for conducting getter processing to the panel members, which have passed through the preliminary getter processing chamber, are intervened between the bake processing chamber and the seal-bonding processing chamber;

as the intermediate processing chambers, a preliminary getter processing chamber to which the panel members that have passed through the bake processing chamber are conveyed and in which getter processing to the inside of the processing chamber is conducted and a getter processing chamber for conducting getter processing to the panel members, which have passed through the preliminary getter processing chamber, are intervened between the bake processing chamber and the seal-bonding processing chamber;

a heat shielding member is provided between the intermediate processing chambers that differ from each other in the set temperature of the temperature control means; and the heat shielding member is formed of a reflective metal.

Since a conventional seal-bonding processing is conducted at substantially the same high temperature as in the previous bake processing, there is a problem in that it is difficult to perform processing that needs to be conducted in the state in which a temperature has been lowered to some extent prior to seal bonding, for example, getter processing for adhering to panel members a getter film that is activated after seal bonding to raise the degree of vacuum in the interior. Alternatively, when a temperature is lowered to some extent after bake processing, and then, seal-bonding processing is conducted, getter processing can be conducted at the lowered temperature before seal-bonding processing. However, in this case, a seal-bonding material with a low seal-bonding temperature needs to be used, and frit glass or the like which is generally used is difficult to be used as a seal-bonding material because it has a high seal-bonding temperature. Thus, there is a problem in that the usable type of a seal-bonding material is limited. According to the present invention, the above-described problems can be solved.

According to the present invention, a plurality of kinds of processing can be continuously performed, and also, in the intermediate processing chambers, various kinds of processing can be conducted while the temperature of the panel members is gradually lowered. Further, the lowering of the temperature until taking-out of the panel members and processing at an appropriate temperature can be conducted parallel with each other, and the seal-bonding portion is locally heated at the time of seal-bonding processing. Thus, the seal-bonding material even with a high seal-bonding temperature can be used by heating at a necessary and minimum level. Further, such a disadvantage can be solved in which gas is remitted from the panel members to lower the degree of vacuum of the atmosphere due to the extreme rerise of temperature, in particular, the rerise of temperature at the time of seal-bonding processing.

FIG. 1A is a diagram schematically showing a manufacturing apparatus according to the present invention, FIG. 1B shows a temperature profile of panel members for forming a display panel of an image display apparatus, and FIG. 1C shows a pressure profile in the manufacturing apparatus. Hereinafter, the manufacturing method and manufacturing apparatus of the present invention will be described with reference to the above drawings.

In FIG. 1A, reference numerals 101 to 104 denote panel members constituting a display panel 144. Reference numeral 101 denotes a rear plate constituting a rear surface of the display panel 144 (hereinafter referred to as RP). The RP 101 in this example has an electron source in which a plurality of electron-emitting devices are arranged in matrix as a phosphor exciting means. Reference numeral 102 denotes a face plate constituting a front surface of the display panel 144 (hereinafter referred to as FP). The FP 102 in this example is formed with a phosphor, a metal back, and the like. Reference numeral 103 denotes an outer frame constituting a side surface of the display panel 144, which is arranged between the RP 101 and the FP 102 and which constitutes the display panel 144 as an airtight container together with the RP 101 and the FP 102. Reference numeral 104 denotes a spacer, which maintains an interval between the RP 101 and the FP 102. In this example, the outer frame 103 and the spacer 104 are fixedly arranged on the RP 101 in advance. Further, a seal-bonding material 143 is provided to an end surface of the outer frame 103.

Among processing chambers for conducting predetermined processing (denoted by reference numerals 105 to 111 in the figure), reference numeral 105 denotes a pre-processing chamber, 106 denotes a bake processing chamber, 110 denotes a seal-bonding processing chamber, and 111 denotes a post-processing chamber. Among intermediate processing chambers (corresponding to the processing chambers denoted by reference numerals 107 to 109 in the figure) which are intervened between the bake processing chamber 106 and the seal-bonding processing chamber 110, reference numeral 107 denotes a surface purifying processing chamber, 108 denotes a preliminary getter processing chamber (chamber getter processing chamber), and 109 denotes a getter processing chamber (panel getter processing chamber). The respective processing chambers are arranged in series and connected with each other in the order shown in the figure in a conveying direction (direction indicated by an arrow 145 in the figure). Each of the processing chambers is exhausted by means of a not-shown vacuum pump, and a necessary vacuum atmosphere is formed therein.

The bake processing chamber 106, the intermediate processing chambers (the surface purifying processing chamber 107, the preliminary getter processing chamber 108, and the getter processing chamber 109), and the seal-bonding processing chamber 110 are provided with temperature control means 121, 122, 123, 124, 127, 128, 132, 133, 136, and 137 in order to control the panel members 101 to 104 at a predetermined temperature. The temperature control means 121, 122, 123, 124, 127, 128, 132, 133, 136, and 137 in this example each are comprised of a hot plate that can be set at a desired temperature. The temperature control means 121, 123, 127, 132, and 136 are supported by elevating machines 138, 139, 140, 141, and 142, respectively, thereby being capable of ascending and descending. The temperature control means each hold the RP 101 and control the RP 101 as well as the outer frame 103 and the spacer 104 which are fixed thereto at a predetermined temperature and also have a function of ascending the RP 101 up to a height required in each processing step. Further, the temperature control means 122, 124, 128, 133, and 137 each hold the FP 102 and control it at a predetermined temperature.

In the case where the hot plates shown in the figure are used as the temperature control means 121, 122, 123, 124, 127, 128, 132, 133, 136, and 137, in particular, the temperature control means 121, 123, 127, 132, and 136 positioned on the upper side preferably employ a chuck method in which the RP 101 can be fixed with a sufficient force without being fallen, for example, a chuck method in which the periphery of the RP 101 is mechanically caught by a claw, an electrostatic chuck method, or a vacuum chuck method.

Gate valves 112 to 119 are provided between the atmosphere and the pre-processing chamber 105, between the adjacent processing chambers, and between the post-processing chamber 111 and the atmosphere. The panel members 101 to 104 open and close the gate valves 112 to 119 to be brought into the preprocessing chamber 105, and then, are sequentially moved to the bake processing chamber 106, the intermediate processing chambers, the seal-bonding processing chamber 110, and the post-processing chamber 111 to be finally taken out from the post-processing chamber 111. Note that reference numeral 120 denotes a conveying roller for moving the panel members 101 to 104 to each processing chamber.

As to the pre-processing chamber 105, the gate valve 112 is opened in the state in which the gate valve 113 is closed, the panel members 101 to 104 are brought into the preprocessing chamber 105, then, the gate valve 112 is closed to exhaust the interior to a predetermined depressurized condition and to open the gate valve 113, and the panel members 101 to 104 are transferred to the bake processing chamber 106. This prevents a situation in which a vacuum atmosphere in each of the bake processing chamber 106 and the subsequent processing chambers is damaged due to bringing-in of the panel members 101 to 104.

The bake processing chamber 106 is for conducting bake processing for heating the panel members 101 to 104 by the temperature control means 121 and 122, thereby emitting moisture, gas, and the like which are adhered or adsorbed to the panel members 101 to 104.

The surface purifying processing chamber 107 is for conducting surface purifying processing in which the surfaces of the panel members 101 to 104 are irradiated with electron beams, ions, ultraviolet rays, or plasma, thereby purifying the surfaces. The surface purifying processing chamber 107 in this example is an electron beam irradiation processing chamber provided with an electron gun 125. In addition, there can be performed surface purifying processing for purifying the surfaces of the panel members 101 to 104 with the irradiation of ions, irradiation of ultraviolet rays, or irradiation of plasma. Note that reference numeral 126 denotes an electron beam radiated from the electron gun 125.

The preliminary getter processing chamber (chamber getter processing chamber) 108 is for flashing a getter material from a chamber getter flashing device 129 to a chamber getter plate 131 which are arranged in the getter processing chamber 108, thereby forming a getter film, and is provided with the purpose of raising a degree of vacuum in the interior and preventing lowering of the degree of vacuum in the next getter processing chamber 109 at the time of bringing the RP 101 and the FP 102 into the getter processing chamber 109. Reference numeral 130 denotes chamber getter flash generated from the chamber getter flashing device, and the flash is obtained by instantaneously evaporating a getter material such as Ba. The chamber getter flash 130 adheres to the chamber getter plate 131 to provide an exhaustion action as a chamber getter, thereby being capable of raising the degree of vacuum in the chamber getter processing chamber 108.

The getter processing chamber (panel getter processing chamber) 109 is for conducting getter processing for forming a getter film on parts of the surfaces of the panel members 101 to 104 which are exposed to the inside of the display panel 144 with the purpose of maintaining the degree of vacuum in the display panel 144 formed after combining and seal-bonding the panel members 101 to 104. Reference numeral 135 denotes panel getter flash generated from a panel getter flashing device 134, and the flash is obtained by instantaneously evaporating the getter material such as Ba. In this example, the getter film is coated to the FP 102.

The seal-bonding processing chamber 110 is for conducting processing in which the panel members 101 to 104 are assembled and seal-bonded by using the seal-bonding material 143 that is softened or melted, thereby forming the display panel 144, and has a local heating means 146 for locally heating a seal-bonding portion (the seal-bonding material 143). The local heating means 146 in this example is located at the position corresponding to the periphery of the RP 101 (the periphery of the hot plate that is the temperature control means 136), and is a hot plate for local heating provided so as to be separated from the hot plate as the temperature control means 136 by a heat insulating material.

In FIG. 1B, the horizontal axis indicates the step in each processing chamber in the manufacturing apparatus in FIGS. 1A, and the vertical axis indicates a temperature of the panel members 101 to 104 in the step in each processing chamber. This temperature profile shows a temperature state of, in particular, the RP 101 and the FP 102. Further, in FIG. 1C, the horizontal axis indicates the step in each processing chamber in the manufacturing apparatus in FIG. 1A, and the vertical axis indicates a pressure in each processing chamber.

The RP 101, which is attached with the outer frame 103 and the spacer 104, and the FP 102 are sequentially conveyed in the direction of the arrow 145 by a drive of the conveying roller 120 that is the conveying means to pass through the respective processing chambers, and are subjected to various kinds of processing while passing through the chambers.

In this example, first, the pre-processing chamber 105 is set at an atmospheric pressure in the state in which the gate valve 113 is closed. Then, the gate valve 112 is opened, and the RP 101, which is previously arranged with the electron source and attached with the outer frame 103 and the spacer 104 at predetermined positions, and the FP 102 which is previously arranged with the phosphor and the metal back are brought into the pre-processing chamber 105. Then, the gate valve 112 is closed to make a predetermined vacuum atmosphere in the pre-processing chamber 105. Thereafter, the gate valve 113 is opened, and the panel members 101 to 104 are transferred to the bake processing chamber 106. Hereafter, in the conveyance of the RP 101 and the FP 102, the gate valves 113 to 119 are sequentially opened or shut between the corresponding processing chambers.

As to the bringing-in of the RP 101 and the FP 102, the RP 101 and the FP 102 are arranged on a jig for conveyance so as to form an interval between the RP 101 and the FP 102. Note that the bringing-in and conveyance are not limited to the case of using the jig, and it is possible to convey the RP 101 and the FP 102 as they are by a support conveyance unit on the apparatus main body side.

The temperature of the panel members 101 to 104 in the pre-processing chamber 105 is generally a room temperature, and is left as it is. Further, in order to easily maintain a necessary vacuum atmosphere in each of the bake processing chamber 106 and the subsequent processing chambers, the pre-processing chamber 105 is preferably depressurized to $10^{-4}$ Pa or less, and more preferably $10^{-5}$ Pa or less before the gate valve 113 is opened to transfer the panel members 101 to 104 to the bake processing chamber 106. In the example shown, the pre-processing chamber 105 is depressurized to $10^{-5}$ Pa.

Next, the panel members 101 to 104 are brought into the bake processing chamber 106. The RP 101 is attached to and held by the temperature control means 121, and also, the FP 102 is attached to and held by the temperature control means 122. In the state in which the gate valves 113 and 114 are closed, the panel members 101 to 104 are heated by the temperature control means 121 and 122. Thus, bake processing is performed. In bake processing, it is preferable that the panel members 101 to 104 are heated up to 300 to 400° C., and more preferably 350 to 380° C. in order that impurities such as hydrogen, oxygen, and moisture, which are adsorbed to the members, are emitted as gas without causing damage to the panel members 101 to 104. Further, in the bake processing chamber 106, the degree of vacuum is lowered due to the moisture and gas components emitted from the panel members 101 to 104. In order to easily maintain the degree of vacuum required in the intermediate processing chambers and the seal-bonding processing chamber 110 that are subsequent to the bake processing chamber 106, at least before the panel members 101 to 104 are transferred to the adjacent intermediate processing chamber (the surface purifying processing chamber 107 in the figure), the inside of the bake processing chamber 106 is preferably depressurized to $10^{-5}$ Pa or less, and more preferably $10^{-6}$ Pa or less. In the example shown, the panel members 101 to 104 are heated up to 380° C., and the inside of the bake processing chamber 106 is depressurized to $10^{-4}$ Pa.

The panel members 101 to 104 that have undergone bake processing in the bake processing chamber 106 are taken off from the temperature control means 121, 122 to be conveyed to the intermediate processing chambers, and are further subjected to necessary kinds of processing before conveyed to the seal-bonding processing chamber 110. In the example shown, as the intermediate processing chambers, the surface purifying processing chamber 107, the preliminary getter processing chamber 108, and the getter processing chamber 109 are provided in this order from the bake processing chamber 106 side. The temperature control means 123, 124, 127, 128, 132, and 133 provided in the respective intermediate processing chambers are set at temperatures equal to or lower than the set temperatures of the respective temperature control means 121, 122, 123, 124, 127, and 128 in the previous processing chambers. Thus, a temperature control is conducted such that the temperature of the panel members 101 to 104 at the time of carrying-out of the members from the intermediate processing chamber concerned is lowered to the temperature of the panel members 101 to 104 at the time of bringing-in of the members to the intermediate processing chamber concerned or lower.

In other words, the intermediate processing chambers involve processing for lowering the temperature of the panel members 101 to 104 to the temperature that enables easily reduction of a cooling processing time (cooling time for taking-out) for obtaining a temperature at which the members can be taken out, which is conducted in the post-processing chamber 111 after the processing in the intermediate processing chamber concerned, the processing in the subsequent intermediate processing chamber, and seal-bonding processing in the seal-bonding processing chamber 110. It depends on the contents of processing in the intermediate processing chamber how far the temperature is lowered in the intermediate processing chamber. However, at least from the viewpoint of reduction of the cooling time for taking-out, it is preferable to lower the temperature of the panel members 101 to 104 at the time of bringing-in of the members to the seal-bonding processing chamber 110 to half the maximum temperature in the bake processing chamber 106 or lower, and more preferably one third of the maximum temperature in the bake processing chamber 106 or lower in a range that seal-bonding processing in the seal-bonding processing chamber 110 is not disturbed.

In the example shown, the panel members 101 to 104 that have passed through the bake processing chamber 106 are conveyed to the surface purifying processing chamber 107 that is one of the intermediate processing chambers. Surface purifying processing in the surface purifying processing chamber 107 is more effective in the case where the temperature of the panel members 101 to 104 is relatively high. It is preferable that the surface purifying processing chamber 107 is connected immediately after processing in the bake processing chamber 106 because effective surface purifying processing is easily performed by utilizing after heat of heating in the bake processing chamber 106. Further, in order to easily maintain the degree of vacuum required in the intermediate processing chambers and the seal-bonding processing chamber 110 which are subsequent to the surface purifying processing chamber 107, the surface purifying processing chamber 107 is preferably depressurized to $10^{-4}$ Pa or less, and more preferably $10^{-5}$ Pa or less at least before the panel members 101 to 104 are transferred to the adjacent intermediate processing chamber (the preliminary getter processing chamber 108 in the figure). In the example shown, the temperature is lowered to 100° C. from 380° C. at which the panel members 101 to 104 have been brought into the surface purifying processing chamber 107, and the inside of the surface purifying processing chamber 107 is depressurized to $10^{-5}$ Pa.

Surface purifying processing is preferably conducted to both of the RP 101 and the FP 102, but may be conducted to any one of them. Further, the surface purifying processing is not limited to the RP 101 and the FP 102, and may be conducted to an arbitrary region in the surface purifying processing chamber 107. Irradiation of electron beams or the like to the inside of the surface purifying processing chamber 107 enables ionization of gas desorbed from the RP 101 and the FP 102 by bake processing and surface purifying processing and acceleration of adsorption of the ionized gas to a getter in the subsequent preliminary getter processing step.

The panel members 101 to 104 that have passed through the surface purifying processing chamber 107 are sequentially conveyed to the preliminary getter processing chamber 108 and the getter processing chamber 109. The panel members 101 to 104 are brought into the getter processing chamber 109 through the preliminary getter processing chamber 108 in which the degree of vacuum is heightened by preliminary getter processing.

The preliminary getter processing chamber 108 is for easily maintaining a high degree of vacuum in the subsequent getter processing chamber 109. An evaporation type getter material (for example, a getter material such as barium) kept in a chamber getter flashing device 129 is heated and evaporated by a method such as resistance heating to generate the chamber getter flash 130. Then, a getter film (not shown) comprised of barium or the like is coated to the surface of the chamber getter plate 131 other than the panel members 101 to 104. The thickness of the getter film is, in general, 5 nm to 500 nm, preferably 10 nm to 200 nm, and more preferably 20 to 200 nm. By preliminary chamber getter processing, the getter film coated to the chamber getter plate 131 adsorbs and removes the gas in the preliminary getter processing chamber 108, thereby being capable of obtaining a high vacuum in the preliminary getter processing chamber 108.

The preliminary getter processing chamber 108 is preferably depressurized to $10^{-5}$ Pa or less, and more preferably $10^{-6}$ Pa or less at least before the panel members 101 to 104 are transferred to the getter processing chamber 109. In the example shown, the preliminary getter processing chamber 108 is depressurized to $10^{-6}$ Pa. Further, the panel members 101 to 104, which have been brought in at 100° C. from the surface purifying processing chamber 107, are carried out from the preliminary getter processing chamber 108 shown in the figure to the getter processing chamber 109 at the same temperature, 100° C. In the case where the temperature at the time of bringing-in of the panel members 101 to 104 is too high for performing getter processing in the getter processing chamber 109, the temperature of the panel members 101 to 104 can be further lowered in the preliminary getter processing chamber 108.

Note that the above-described preliminary getter processing in the preliminary getter processing chamber 108 is chamber getter processing for removing gas in a chamber. Chamber getter processing may not be conducted by providing an independent processing chamber as in the example shown, but may be conducted in the getter processing chamber 109 described next prior to getter processing to the panel members 101 to 104 (panel getter processing).

The panel members 101 to 104 that have passed through the preliminary getter processing chamber 108 are conveyed to the panel getter processing chamber 109. In the panel getter processing chamber 109, an evaporation type getter material (for example, a getter material such as barium) kept in the panel getter flashing device 134 is heated and evaporated by a method such as resistance heating to generate the panel getter flash 135. Then, a getter film (not shown) comprised of barium or the like is coated to at least a part of the panel members 101 to 104 (the surface of the FP in the figure). The thickness of the getter film is, in general, 5 nm to 500 nm, preferably 10 nm to 200 nm, and more preferably 20 to 200 nm.

The temperature of the panel members 101 to 104 that are brought in from the preliminary getter processing chamber 108 is lowered as described above. Thus, such a situation can be prevented in which the getter film coated to the surfaces of the panel members 101 to 104 by getter processing in the getter processing chamber 109 is deteriorated due to the heat of the panel members 101 to 104, as a result of which the getter film is hard to function as a getter for maintaining a high degree of vacuum in the seal-bonded display panel 144.

The getter processing chamber 109 is preferably maintained in a depressurized state of $10^{-5}$ Pa or less, and more preferably $10^{-6}$ Pa or less in order to easily maintain a function of the getter film coated to the surfaces of the panel members 101 to 104 and a high degree of vacuum of the seal-bonding processing chamber 110 that is subsequent to the getter processing chamber 109. In the example shown, the getter processing chamber 109 is depressurized to $10^{-6}$ Pa. Further, the panel members 101 to 104, which have been brought into the getter processing chamber 109 at 100° C. from the preliminary getter processing chamber 108, are carried out from the getter processing chamber 109 shown in the figure to the seal-bonding processing chamber 110 at the same temperature, 100° C. In the case where the temperature at the time of bringing-in of the panel members 101 to 104 is too high for performing getter processing, the temperature of the panel members 101 to 104 can be further lowered in the getter processing chamber 109 before getter processing.

In FIG. 1A, the getter film is coated onto the FP 102. However, a member, to which the getter film is provided, is not limited to the FP 102, and the getter film may be provided to the RP 101. However, since a getter material generally has conductivity, this may invite a problem in that the getter material generates a large leak current, a problem in that the getter material lowers pressure-resistance of a driving voltage, and the like at the time of driving image display of the manufactured display panel 144. For example, there is a case in which, if the RP 101 is coated with the getter film, a conductive getter film is also deposited on the outer frame 103 and the spacer 104, as a result of which an electrical problem at the time of drive is caused. In such a case, it is preferable that the getter film is deposited only on a necessary portion of the RP 101 while the portion that should not be coated and deposited with the getter film is kept not being coated with the getter film by being covered with a deposition mask formed of a metal thin plate.

Note that in the getter processing chamber 109, the degree of vacuum is temporarily lowered at the time of flashing of the getter material, but is shifted to a high vacuum by vacuum exhaustion. Further, in addition to the above-described formation of the getter film with the evaporation type getter material, a non-evaporation type getter film or non-evaporation type getter member, which is comprised of a titanium material or the like, may be previously provided on the RP 101 and the FP 102.

The panel members 101 to 104 that have passed through the getter processing chamber 109 are brought into the seal-bonding processing chamber 110 and are subjected to seal-bonding processing.

The RP 101 and the FP 102 that are brought into the seal-bonding processing chamber 110 are attached to the temperature control means 136 and 137, respectively. At this time, the seal-bonding material 143 on the outer frame 103 and the spacer 104, which are fixedly arranged to the RP 101 do not contact with the FP 102, and a small interval is provided therebetween. Further, at the time of this attachment, the relative positions of the RP 101 and the FP 102 are determined. The determination of the relative positions can be conducted by an end standard with a bumping pin, or the like, but is not limited to this.

In seal-bonding processing, a seal-bonding portion is locally heated by the local heating means 146, the seal-bonding material 143 is softened or melted, then, the elevating machine 142 is made to descend to make the outer frame 103 fixedly arranged to the RP 101 contact and press against the FP 102, and at the same time, the temperature of the seal-bonding material 143 is lowered to a curing and hardening temperature or lower. At the point of time when the temperature of the seal-bonding material 143 is lowered to the curing and hardening temperature or lower, seal-bonding processing is completed. Thereafter, the RP 101 is taken off from the temperature control means 136, and the elevating machine 142 is made to ascend; at the same time, the FP 102 is taken off from the temperature control means 137. Then, the display panel 144 constituted of the RP 101, the FP 102, the outer frame 103, and the spacer 104 is moved to the post-processing chamber 111.

As described above, in the seal-bonding processing of the present invention, local heating is conducted. By the local heating, even if the temperature of the panel members 101 to 104 is lowered to a seal-bonding temperature of the seal-bonding material 143 or lower, seal-bonding can be easily conducted by softening or melting the seal-bonding material 143. Further, since softening or melting of the seal-bonding material 143 is performed by the local heating, the whole of the panel members 101 to 104 is not heated again. Thus, both reduction of heat energy and prevention of emission of a gas component due to re-heating can be attained.

The above-mentioned local heating can be conducted with the hot plate for local heating, which is shown in the figure. In addition, the local heating may be performed by providing a high frequency induction heating apparatus for local heating instead of the hot plate for local heating or by irradiating the seal-bonding portion with infrared rays or laser light through a glass window for heating which is previously provided to the seal-bonding processing chamber 110.

In the example shown, seal-bonding is performed by using the seal-bonding material 143 previously provided on the end surface of the outer frame 103 provided to the RP 101. However, the seal-bonding material 143 may be previously provided at a position of the FP 102 which corresponds to the outer frame 103. Further, the outer frame 103 may be provided to the FP 102 in advance, and the seal-bonding material 143 may be provided on the end surface of the outer frame 103, or the seal-bonding material 143 may be provided at a position of the RP 101 which corresponds to the outer frame 103. Furthermore, the seal-bonding material 143 may be provided to both the end surface of the outer frame 103 and the position of the FP 102 or RP 101 which corresponds to the outer frame 103.

As to the seal-bonding material 143, it is preferable to use a seal-bonding material with a low seal-bonding temperature in order to reduce a local heating time and quantity of heat in the seal-bonding processing chamber 110, that is, to use a low melting point metal or an alloy thereof, for example, a gallium-indium alloy, a gallium-tin alloy, or an aluminum-gallium alloy. However, the seal-bonding material 143 in the present invention is not limited to the above-mentioned materials with a low melting point. A strong sealing state can be easily obtained by using general-purpose frit glass as the seal-bonding material 143.

In the example shown, the local heating means 146 and the temperature control means 136 and 137 are provided in the seal-bonding processing chamber 110, but the temperature control means 136 and 137 may be omitted. However, when the temperature control means 136 and 137 are provided, and are set to a temperature equal to or lower than the set temperature of the temperature control means in the intermediate processing chamber that is previous to the seal-bonding processing chamber 110 (the temperature control means 132 and 133 in the getter processing chamber 109 in the figure), the temperature rise of the panel members 101 to 104 due to transmission of the heat from the local heating means 146 to the surrounding of the seal-bonding portion can be suppressed, and a cooling time in the post-processing chamber 111 can be shortened. In the example shown, the panel members 101 to 104 except the local heating portion are maintained at 100° C. Further, the vacuum atmosphere in the seal-bonding processing chamber 110 has a direct influence on the vacuum atmosphere in the display panel to be manufactured, and thus is preferably a high vacuum, specifically, $10^{-5}$ Pa or less, and more preferably $10^{-6}$ Pa or less. In the example shown, the vacuum atmosphere is at $10^{-6}$ Pa.

The display panel 144, which has undergone seal-bonding processing and has been assembled in the seal-bonding processing chamber 110, is conveyed to the post-processing chamber 111, and is cooled to a taking-out temperature (a room temperature in the example shown). Thereafter, the pressure of the post-processing chamber 111 is raised to an atmospheric pressure, and then, the display panel 144 is taken out from the gate valve 119. As temperature control means (not shown) in the post-processing chamber 111, a cooling plate having a temperature control function with water cooling can be used as long as there does not occur the damage due to a steep temperature fall of the sealed display panel 144, but natural cooling may be conducted in the post-processing chamber 111. As to the post-processing chamber 111, it is preferable that: the display panel 144 is taken out; then, the gate valve 119 is shut; and prior to the start of the next step, the chamber is returned to a predetermined depressurized state by a vacuum exhaust system (not shown) which is independently arranged.

In the example shown, the gate valves 112 to 119 are respectively arranged between the inside of the apparatus and the external atmosphere and between the respective adjacent processing chambers. However, it is sufficient that the gate valves are provided at least between the processing chambers that differ in a pressure of the pressure profile shown in FIG. 1C and between the inside of the apparatus and the external atmosphere. For example, there may be omitted the gate valves (the gate valves 116 and 117 in the figure) between the intermediate processing chambers the pressures of the pressure profile of which are equal to each other, such as the chamber getter processing chamber 108, the panel getter processing chamber 109, and the seal-bonding processing chamber 110.

Between the processing chambers that differ in a temperature of a temperature profile shown in FIG. 1B (the processing chambers that differ in the set temperature with respect to the temperature control means 121, 122, 123, 124, 127, 128, 132, 133, 136, and 137), it is preferable that a heat shielding member (with a plate shape, a film shape, or the like) which is formed of a reflective metal such as aluminum, chromium, or stainless steel is arranged, whereby the conveyance of the panel members is conducted through the processing chambers while heat radiation is blocked off.

In the case where processing is performed in the state in which only one set of panel members 101 to 104 exists between the pre-processing chamber 105 and the post-processing chamber 111, the difference in a processing time in each processing chamber is not particularly a problem. However, in the case where a plurality of sets of panel members 101 to 104 are conveyed from the pre-processing chamber 105 to the post-processing chamber 111 one after another and are sequentially subjected to processing, there may be a case where the conveyance cannot be smoothly performed due to the difference in a processing time in each processing chamber. In this case, as to the step with a long processing time, in order that the step conforms to another step with a short processing time in a processing time, the same processing step is conducted over a plurality of processing chambers, or the same processing in the same processing chamber is simultaneously conducted to the plurality of sets of panel members 101 to 104.

The intermediate processing chambers in the example shown are the surface purifying processing chamber 107, the preliminary getter processing chamber 108, and the getter processing chamber 109, but all the above chambers are not necessarily interposed as the intermediate processing chambers. One or more than one chambers of those chambers may be interposed, or intermediate processing chambers other than those chambers may be interposed.

As the above-mentioned other intermediate processing chamber, for example, there can be given a cooling processing chamber (not shown) for conducting cooling processing for the panel members 101 to 104. The cooling processing chamber can be provided with the same structure as that of, for example, the bake processing chamber 106 in which the set temperature of the temperature control means 121, 122 is set at an appropriate low temperature. For example, in the case where the getter processing chamber 109 is included as the intermediate processing chamber, if the cooling processing chamber is intervened between the bake processing chamber 106 and the getter processing chamber 109, the temperature of the panel members 101 to 104 can be easily lowered to the temperature at which the getter processing is not disturbed. Further, in the case where the surface purifying processing chamber 107 is included as the intermediate processing chamber, the cooling processing chamber may be intervened between the bake processing chamber 106 and the surface purifying processing chamber 107; moreover, in the case where the getter processing chamber 109 is further included, the cooling processing chamber is preferably intervened between the surface purifying processing chamber 107 and the getter processing chamber 109.

Temperature control means (not shown) in the cooling processing chamber is set to a temperature equal to or lower than the set temperature of the temperature control means in the previous processing chamber. Temperature control is conducted such that the temperature of the panel members 101 to 104 at the time of carrying-out is equal to or lower than the temperature of the panel members 101 to 104 at the time of bringing-in. This is the same as in the temperature control members 123, 124, 127, 128, 132, and 133 in the above-described intermediate processing chambers.

The intermediate processing chambers shown in the figure show an example. In the present invention, various kinds of combination of intermediate processing chambers can be adopted. As other examples of the intermediate processing chambers intervened between the bake processing chamber 106 and the seal-bonding processing chamber 110, the following may be given. Only the getter processing chamber 109 is intervened therebetween, and only getter processing is conducted as intermediate processing. Also, two chambers, the surface purifying processing chamber 107 and the getter processing chamber 109 are intervened in this order from the bake processing chamber 106 side, and surface purifying processing and getter processing are conducted as intermediate processing. Also, two chambers, the preliminary getter processing chamber 108 and the getter processing chamber 109 are intervened, and preliminary getter processing and getter processing are conducted as intermediate processing.

Further, the bringing-in of the panel members 101 to 104 can be conducted with respect to three parts, the RP 101, the FP 102, and the outer frame 103 fixedly arranged with the spacer 104. In this case, in the seal-bonding processing chamber 110, the RP 101 is seal-bonded to one side of the outer frame 103, and the FP 102 is seal-bonded to the other side of the outer frame 103. Thus, it is necessary that the seal-bonding material 143 is provided on both the end surfaces of the outer frame 103 and/or at the positions of the RP 101 and the FP 102 which correspond to the positions of the outer frame 103. Further, it is necessary that the seal-bonding portions of the RP 101 and the FP 102 are locally heated by the local heating means 146.

As described above, in the case where the panel members 101 to 104 are brought into the apparatus as the three parts to be processed, the respective processing chambers after the pre-processing chamber 105 through the getter processing chamber 109 are arranged in three lines, the three parts are brought into the separate lines, and the three getter processing chambers 109 are connected so as to join one seal-bonding processing chamber 110. Thus, the three parts may be joined in the seal-bonding processing chamber 110 to perform seal-bonding processing. Further, as in the example shown, in the case where the panel members 101 to 104 are brought in as two parts, the respective processing chambers after the pre-processing chamber 105 through the getter processing chamber 109 are arranged in two lines, the two parts are brought into the separate lines, and the two getter processing chambers 109 are connected so as to join one seal-bonding processing chamber 110. Thus, the two parts may be joined in the seal-bonding processing chamber 110 to perform seal-bonding processing. In case of the three-line or two-line processing, it is possible that the getter processing chamber 109 is provided with respect to only one of the members (preferably, the FP 102), and getter processing chambers 109 for other members are omitted.

FIG. 2 is a sectional view showing a part of the display panel 144 manufactured by using the manufacturing method and manufacturing apparatus according to the present invention. In the figure, the same reference numerals as those in FIG. 1A designate the same parts.

As shown in the figure, the display panel 144 is formed by the RP 101, the FP 102, and the outer frame 103 as a vacuum container or depressurizing container having an airtight panel shape. In the case where the display panel is formed as the depressurizing container, inert gas such as argon gas or neon gas, or hydrogen gas can be contained under reduced pressure in the interior. Further, in the case where the display panel is formed as the vacuum container, the interior can be set to a high vacuum, $10^{-5}$ Pa or more, and preferably $10^{-6}$ Pa or more.

In the display panel 144, the spacer 104 is arranged to form an atmospheric pressure-resistance structure. The spacer 104 shown in the figure includes a main body 311 comprised of a non alkali insulating substance such as no alkali glass, a high-resistance film 309 formed of a high-resistance substance arranged to cover the surface of the main body 311, and a metal (tungsten, copper, silver, gold, molybdenum, an alloy thereof, or the like) film 310 provided to both ends of the main body 311, and is electrically connected and adhered onto a wiring 306 through a conductive adhesive 308. In the case where the display panel 144 is manufactured based on the example of FIGS. 1A to 1C, one of the end portions of the spacer 104 is fixedly adhered to the RP 101 by the adhesive 308 in advance before bringing-in of the panel members to the pre-processing chamber 105, and at the point of time when seal-bonding processing is completed in the seal-bonding processing chamber 110, the other end portion of the spacer 104 and the FP 102 are arranged to contact with each other in an electrically connected state.

In the RP 101, a base film ($SiO_2$, $SnO_2$, or the like) 305 for preventing inflow of alkali such as sodium is provided on a transparent substrate 304 such as glass, and a plurality of electron emitting-devices 312 arranged in an XY matrix form are provided on the base film 305. The wiring 306 constitutes a cathode side wiring of a cathode side XY matrix wiring connected to the electron emitting-devices 312. Further, according to the present invention, instead of the electron emitting-devices 312 that are phosphor exciting means, the display panel 144 having plasma generating devices can be manufactured. In case of this display panel 144, inert gas such as argon gas or neon gas, or hydrogen gas is contained under reduced pressure in the interior.

In the FP 102, on a transparent substrate 301 made of glass or the like, a phosphor layer 302 and an anode metal (aluminum, silver, copper, or the like) film 303 connected to an anode source (not shown) are arranged. Further, in case of the above-described display panel 144 having plasma generating devices, a color filter may be used instead of the phosphor layer 302.

In the case where the display panel 144 is manufactured based on the example of FIG. 1, one end surface of the outer frame 103 is fixedly adhered to the RP 101 by an adhesive 307 in advance before bringing-in of the panel members to the preprocessing chamber 105, and the other end surface is fixedly adhered to the FP 102 by the seal-bonding material 143 by seal-bonding processing in the seal-bonding processing chamber 110.

According to the present invention, in the manufacture of an image display apparatus which includes the steps of: performing bake processing to panel members constituting a display panel of the image display apparatus; and combining and seal-bonding the members, thereby forming the display panel, various kinds of processing can be efficiently performed without disturbing the use of the seal-bonding material with a high seal-bonding temperature. Further, in manufacturing the image display apparatus in which the electron emitting devices or plasma generating devices are provided with a large capacity, for example, a million pixels or more in the XY direction, and the mass pixels are provided in a large screen a diagonal size of which is 30 inches or more, the manufacturing time can be reduced remarkably, and also, the inside of the display panel can be easily set to the high vacuum of $10^{-6}$ Pa or more.

What is claimed is:

1. A method of manufacturing an image display apparatus, comprising the steps of:

conveying panel members constituting a display panel of the image display apparatus to a plurality of depressurized processing chambers in due order and performing a plurality of kinds of processing, thereby forming the display panel, wherein, the plurality of processing chambers include a bake processing chamber for subjecting the panel members to bake processing and a seal-bonding processing chamber for assembling and seal-bonding the panel members; and a temperature of the panel members that have undergone bake processing in the bake processing chamber is lowered to a predetermined temperature, then the panel members are brought into the seal-bonding processing chamber, and seal-bonding processing in the seal-bonding processing chamber is conducted by locally heating a seal-bonding material disposed on a seal-bonding portion of the panel members to a temperature equal to or higher than a melting point, wherein the melting point of the seal-bonding material is equal to or higher than the predetermined temperature.

2. A method of manufacturing an image display apparatus, comprising the steps of:

conveying panel members constituting a display panel of the image display apparatus to a plurality of depressurized processing chambers in due order and performing a plurality of kinds of processing, thereby forming the display panel, wherein, the plurality of processing chambers include a bake processing chamber for subjecting the panel members to bake processing, a seal-bonding processing chamber for assembling and seal-bonding the panel members, and one or more intermediate processing chambers which are intervened between the bake processing chamber and the seal-bonding processing chamber and with which the temperature at the time of carrying-out of the panel members is set to the temperature at the time of bringing-in of the panel members or lower; and the temperature of the panel members that have undergone bake processing in the bake processing chamber is lowered to a predetermined temperature in the intermediate processing chambers, then the panel members are brought into the seal-bonding processing chamber, and seal-bonding processing in the seal-bonding processing chamber is conducted by locally heating a seal-bonding material disposed on a seal-bonding portion of the panel members to a temperature equal to or higher than a melting point, wherein the melting point of the seal-bonding material is equal to or higher than the predetermined temperature.

3. A method of manufacturing an image display apparatus according to claim 2, wherein:
a getter processing chamber as the intermediate processing chamber is intervened between the bake processing chamber and the seal-bonding processing chamber; and
getter processing is conducted to the panel members, which have passed through the bake processing chamber, in the getter processing chamber.

4. A method of manufacturing an image display apparatus according to claim 3, wherein getter processing to the inside of the getter processing chamber is further conducted in the getter processing chamber.

5. A method of manufacturing an image display apparatus according to claim 3, wherein:
a cooling processing chamber as the intermediate processing chamber is intervened between the bake processing chamber and the getter processing chamber; and
cooling processing is conducted to the panel members, which have passed through the bake processing chamber, in the cooling processing chamber.

6. A method of manufacturing an image display apparatus according to claim 2, wherein:
a surface purifying processing chamber and a getter processing chamber as the intermediate processing chambers are intervened between the bake processing chamber and the seal-bonding processing chamber;
surface purifying processing is conducted to the panel members, which have passed through the bake processing chamber, in the surface purifying processing chamber; and
getter processing is conducted to the panel members, which have passed through the surface purifying processing chamber, in the getter processing chamber.

7. A method of manufacturing an image display apparatus according to claim 6, wherein:
a cooling processing chamber as the intermediate processing chamber is intervened between the bake processing chamber and the surface purifying processing chamber; and
cooling processing is conducted to the panel members, which have passed through the bake processing chamber, in the cooling processing chamber.

8. A method of manufacturing an image display apparatus according to claim 6, wherein:
a cooling processing chamber as the intermediate processing chamber is intervened between the surface purifying processing chamber and the getter processing chamber; and
cooling processing is conducted to the panel members, which have passed through the surface purifying processing chamber, in the cooling processing chamber.

9. A method of manufacturing an image display apparatus according to claim 6, wherein the getter processing in the getter processing chamber is conducted immediately after the surface purifying processing in the surface purifying processing chamber.

10. A method of manufacturing an image display apparatus according to claim 2, wherein:
a surface purifying processing chamber, a preliminary getter processing chamber, and a getter processing chamber as the intermediate processing chambers are intervened between the bake processing chamber and the seal-bonding processing chamber;
surface purifying processing is conducted to the panel members, which have passed through the bake processing chamber, in the surface purifying processing chamber;
the panel members, which have passed through the surface purifying processing chamber, are brought into the preliminary getter processing chamber to conduct getter processing in the preliminary getter processing chamber; and
getter processing is conducted to the panel members, which have passed through the preliminary getter processing chamber, in the getter processing chamber.

11. A method of manufacturing an image display apparatus according to claim 10, wherein:
a cooling processing chamber as the intermediate processing chamber is intervened between the surface purifying processing chamber and the preliminary getter processing chamber; and
cooling processing is conducted to the panel members, which have passed through the surface purifying processing chamber, in the cooling processing chamber.

12. A method of manufacturing an image display apparatus according to claim 10, wherein the getter processing in the getter processing chamber is conducted immediately after the surface purifying processing in the surface purifying processing chamber.

13. A method of manufacturing an image display apparatus according to claim 6, wherein the surface purifying processing is any of processing for purifying surfaces of the panel members with irradiation of electron beams to the surfaces of the panel members, processing for purifying surfaces of the panel members with irradiation of ions to the surfaces of the panel members, processing for purifying surfaces of the panel members with irradiation of ultraviolet rays to the surfaces of the panel members, and processing for purifying surfaces of the panel members with irradiation of plasma to the surfaces of the panel members.

14. A method of manufacturing an image display apparatus according to claim 2, wherein:
a preliminary getter processing chamber and a getter processing chamber as the intermediate processing chambers are intervened between the bake processing chamber and the seal-bonding processing chamber;
the panel members, which have passed through the bake processing chamber, are brought into the preliminary getter processing chamber to conduct getter processing in the preliminary getter processing chamber; and
getter processing is conducted to the panel members, which have passed through the preliminary getter processing chamber, in the getter processing chamber.

15. A method of manufacturing an image display apparatus according to claim 14, wherein:
a cooling processing chamber as the intermediate processing chamber is intervened between the bake processing chamber and the preliminary getter processing chamber; and cooling processing is conducted to the panel members, which have passed through the bake processing chamber, in the cooling processing chamber.

16. A method of manufacturing an image display apparatus according to claim 2, wherein:

the seal-bonding processing in the seal-bonding processing chamber is processing using a seal-bonding material; and the seal-bonding material has a seal-bonding temperature that is equal to or higher than the temperature at the time of bringing-in of the panel members to the seal-bonding processing chamber and also is equal to or lower than a local heating temperature of a seal-bonding portion to the seal-bonding processing chamber.

17. A method of manufacturing an image display apparatus according to claim 2, wherein:

the panel members include a face plate constituting a display surface of the display panel and a rear plate constituting a rear surface of the display panel; and the seal-bonding processing in the seal-bonding processing chamber is processing for seal-bonding the periphery of the face plate and the rear plate opposed to each other.

18. A method of manufacturing an image display apparatus according to claim 17, wherein the seal-bonding processing is conducted using the seal-bonding material provided to either or both of the face plate side and the rear plate side.

19. A method of manufacturing an image display apparatus according to claim 17, wherein:

an outer frame constituting a side surface of the panel is previously fixed to one of the face plate and the rear plate; and the seal-bonding material is provided to either or both of the outer frame and the position of the face plate or rear plate which is opposite to the outer frame.

* * * * *

UNITED STATES PATENT AND TRADEMARK OFFICE
CERTIFICATE OF CORRECTION

PATENT NO. : 7,152,433 B2  Page 1 of 1
APPLICATION NO. : 10/212098
DATED : December 26, 2006
INVENTOR(S) : Kohei Nakata It is certified that error appears in the above-identified patent and that said Letters Patent is hereby corrected as shown below:

COLUMN 1:

Line 27, "from" should read --from the chamber (JP 11-135018 A).--
Line 28, "the chamber" should be deleted.
Line 29, "(JP 11-135018)." should be deleted.

Signed and Sealed this

Fifth Day of August, 2008

JON W. DUDAS
*Director of the United States Patent and Trademark Office*